United States Patent

Keller et al.

[15] 3,641,276

[45] Feb. 8, 1972

[54] AUTOMATIC ELECTRONIC PAGING SYSTEM

[72] Inventors: Michael I. Keller, 4112 South 36th St., Arlington County, Va. 22206; Dayne G. Gardner, Springfield, Va.

[73] Assignee: said Keller by said Gardner

[22] Filed: Sept. 29, 1969

[21] Appl. No.: 861,964

[52] U.S. Cl. ....................................179/18 BF, 179/41
[51] Int. Cl. ....................................H04m 11/00
[58] Field of Search ....................179/2 A, 18.04, 2 AS, 1 AT; 340/311, 312

[56] References Cited

UNITED STATES PATENTS

| | | | |
|---|---|---|---|
| 2,663,850 | 12/1953 | Mellinger et al. | 179/1 |
| 3,137,771 | 6/1964 | Klein | 179/18.04 |
| 3,376,389 | 4/1968 | Fair | 179/2 A |
| 3,400,378 | 9/1968 | Smith et al. | 179/2 A |
| 3,527,891 | 9/1970 | Johnston | 179/2 A |
| 3,531,597 | 9/1970 | Andrews et al. | 179/2 A |
| 2,330,355 | 9/1943 | Hershey | 340/312 |
| 2,496,629 | 2/1950 | Lamberty et al. | 340/312 |
| 2,412,516 | 12/1946 | Kavanagh | 340/312 |
| 2,838,749 | 6/1958 | Rumler et al. | 340/312 |
| 3,092,689 | 6/1963 | Sandstrom | 340/312 |
| 3,418,650 | 12/1968 | Rich et al. | 340/311 |

*Primary Examiner*—William C. Cooper
*Assistant Examiner*—Jan S. Black
*Attorney*—Sughrue, Rothwell, Mion, Zinn and Macpeak

[57] ABSTRACT

Disclosed herein is an automatic electronic paging system. Each subscriber is identified by a unique identification code which is selectively converted to a supplemental identification code upon a subscriber entering a paging area. The supplemental identification codes are unique within each paging area but not unique within the overall paging system. A plurality of sensor units are located within each paging area, each of the sensor units having temporarily and selectively stored therein a supplemental code corresponding to one of the unique identification codes identifying a subscriber within the paging area. The paging signal, in the form of a unique identification code is sent to the paging area where it is converted to a corresponding assigned supplemental identification code. The supplemental code is transmitted to all sensors in the area with a paging signal being generated at the one sensor containing the transmitted supplemental code. In response to the receipt of a paging signal, a subscriber can send an acknowledgment code to the pager.

8 Claims, 7 Drawing Figures

INVENTORS

MICHAEL I. KELLER
DAYNE G. GARDNER

INVENTORS

MICHAEL I. KELLER
DAYNE G. GARDNER

INVENTORS
MICHAEL I. KELLER
DAYNE G. GARDNER

AUTOMATIC ELECTRONIC PAGING SYSTEM

This invention relates to automatic electronic paging systems and more particularly to automatic electronic paging systems for use by numbers of individuals by utilizing telephone lines in conjunction with commercial or private telephone systems.

Paging systems are currently utilized by many persons. Prior systems require an answering service and the relaying of information to the appropriate subscriber in several forms and stimulations. "Subscribers" is a convenient term for describing those persons equipped with the proper equipment to be capable of being paged by radio, etc. The selective paging systems employing radio techniques utilize a digital identification format to appropriately call the desired party. This system is particularly useful when all parties are on a common radiofrequency. However in such systems, subscribers can not move from one geographical area to another and directly enter another similar paging network without first determining that the subscriber code is proper. In all likelihood the digital code response of the receiver would require a reassignment due to a previous assignment to a subscriber in the new geographical area. A system having the aforedescribed capabilities is disclosed in U.S. Pat. No. 3,114,142 dtd Dec. 10, 1963 by H. W. Bode, et al. One advantage of the Bode type system is that it affords the subscriber freedom of movement, limited however by the ability to receive a radio signal and the uniqueness of receiving a stimulation only when specifically called. Prior paging systems suffer the disadvantage that they do not provide a means for sending an acknowledgement transmission from the paged party as this would approximate standard two-way radio communications giving rise to problems relating to Government regulations as well as interference problems with surrounding radio equipment.

It is therefore deemed desirable that a system be provided that overcomes the aforementioned inherent difficulties of nonacknowledgement radio receiver paging systems, and conveniently offer paging systems having the capability of providing to the general public an essentially unlimited, automatic paging capability, and without any geographic limitation. In accordance with the present invention, there is provided a system capable of servicing the general public while not requiring the use of radio equipment. The system disclosed can conveniently signal on a two-way basis, thereby incorporating acknowledgement.

Accordingly, it is the principal object of the present invention to provide the general public with a subscriber paging service independent of radio equipment and on an automatic basis. The automatic electronic paging system of the present invention can be a commercial service offered to subscribers on a subscription basis. The system can be provided in such places as theaters, ball parks, stadiums, restaurants, passenger trains, and other places of public accommodation offering a patron seating or relatively fixed position while in attendance. The embodiments of this invention rely on wire communications capability, but as will be understood by those skilled in the art, the broad teachings of the invention are not so limited. For example, radio equipment may be utilized as part of the telephone system.

It is another object of the present invention to provide rapid, automatic access to the subscriber independent of geography.

Yet another object of the present invention is to provide a paging system which can be conveniently provided within buildings and establishments such as theaters, restaurants, offices, factories, and other appropriate places requiring an automatic paging system of the type of this invention.

Another object of the present invention is to provide a means for increasing subscriber features and services by use of a recording, print out mechanism, and display means.

The foregoing and other objects, features and advantages of the invention will be apparent from the following more particular description of embodiments of the present invention, as illustrated in the accompanying drawings.

The present invention provides an automatic electronic paging system whereby subscribers can be paged without the use of radio equipment on the person and is particularly useful within locations aforementioned which are generally difficult to service with radio equipment.

Figure 1:
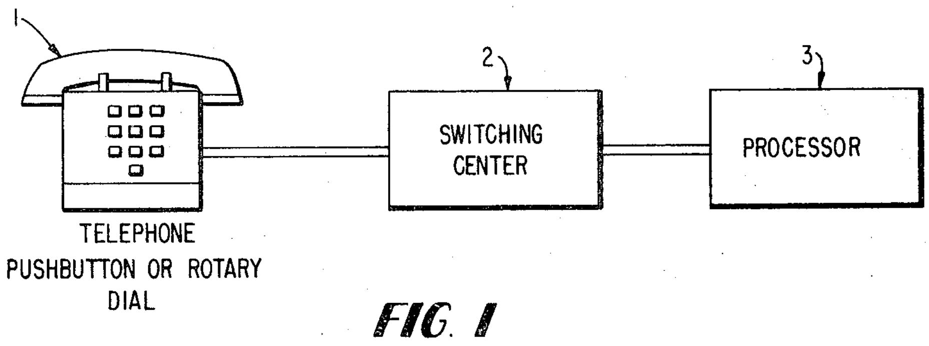
FIGS. 1 and 2 are a block diagram of an automatic electronic paging system including a plural sensor equipment which may advantageously embody the invention.
Figure 2:
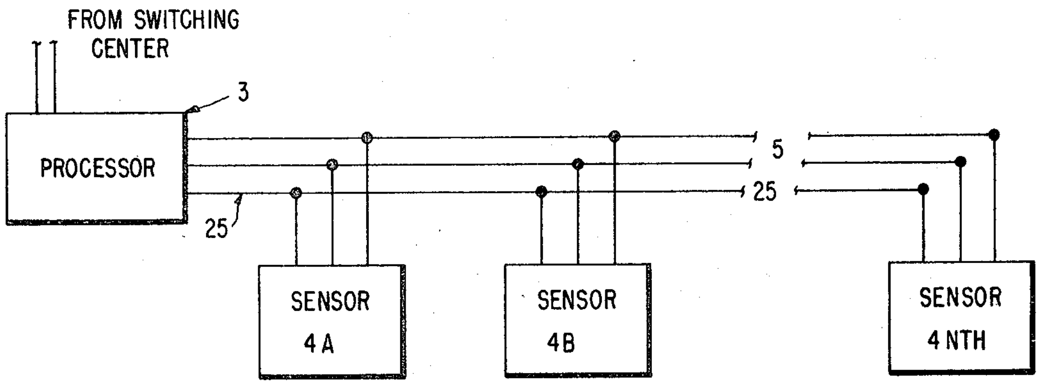

With reference to FIGS. 1 and 2, the telephone instrument 1, is representative of an entire telephone system commonly available to the general public, which is attached to a switching center 2, of any commercial or private type which is in turn connected to a processor 3, having an automatic answering and hang up capability. FIG. 2 represents the processor 3 and sensor units 4A, 4B, through 4nth connected to a paging communication lines 5, aspects of which are an advantageous feature of the present invention. It should be noted that the lines 5, are readily extendable to include any requisite number of sensor units, (4A, 4B through 4nth). The processor 3, as explained below provides the logic and control for the present invention. The processor 3, is placed in locations acquiring the automatic electronic paging system as is the present invention as aforementioned.

Figure 4:
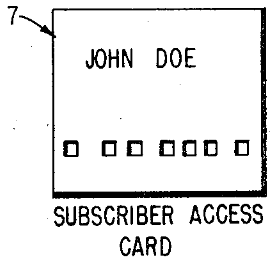
FIG. 4 is a diagram of the subscriber access card which may advantageously embody the invention.

Operation of the present invention is initiated by a subscriber who has previously purchased a subscriber access card 7 (FIG. 4) from the commercial organization providing the paging service equipment. Each of the subscriber access cards, being similar to a plastic credit card in nature, has a uniquely formated machine identification readable code which is not repeated regardless of the number of subscribers to the system.

Figure 3:
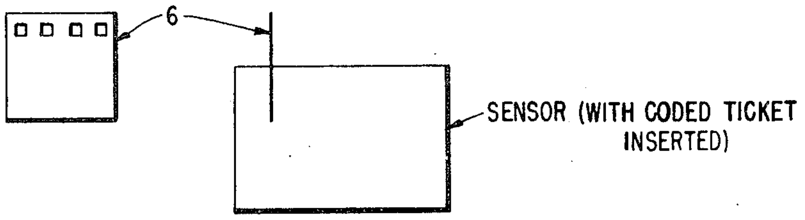
FIG. 3 is a diagram of the sensor equipment which may advantageously embody the invention.
Figure 6:
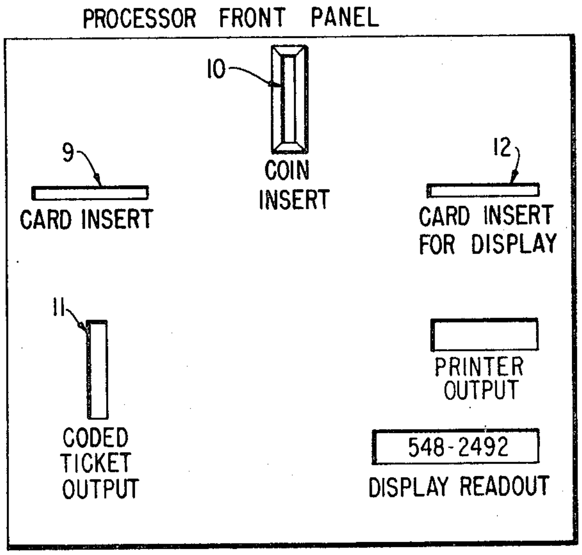
FIG. 6 is a diagram of the front panel of the processor in simplified form representing the functional requirements associated with subscriber usage.

The subscriber upon entering a building or other of the aforementioned locations, and further desiring the use of the paging system, inserts his subscriber access card in card insert slot 9 and an appropriate fee in slot 10 of the processor, the front panel of which is illustrated in FIG. 6. The processor of the present invention having an internal memory records in appropriate form the unique identification code which has been recorded on the subscriber access card. The subscriber access card is then returned to the subscriber and a coded ticket is issued via the coded ticket output slot 11. The subscriber is thereafter assumed to proceed to an unknown position or seat within the building, or other aforementioned locations, to a chair as in a theater. The sensor unit, FIG. 3, is permanently installed in plural and in extensive installations in a quantity so as to provide the paging system capability to large numbers of subscribers. The coded ticket 6, which was previously issued to the subscriber, has been coded and recorded by the processor with a supplemental identification code requisite with the number of sensors in the particular location. On the basis, for example, that 50 sensors were installed in a particular theater, the ticket issued to a subscriber would be coded to represent a number between one and 50 depending on the numbers which had been assigned to other subscribers prior to the arrival of the subscriber being used as an example herein. The sensors are not permanently assigned a supplemental identification code.

In a theater, for example, the plural sensor units would be associated with individual seats. The subscribers would insert the coded ticket 6 in the sensor associated with his seat as shown in FIG. 3. Similarily the same actions are being or have been accomplished by additional subscribers having coded tickets and uniquely identified individual subscriber access cards, thereby being recorded and related by the processor on a one for one basis. The advantages of providing the coded ticket in the present invention lie in the reduction of the complexity of the sensor units to that comparable with the number of installed sensors in a particular location; and also the means to additionally, directly collect a service usage renumeration. It must be noted that a coded ticket issued to a subscriber in this manner is not limited for use in one particular serviced location, but retains the flexibility to be used with any sensor within the location, and whose use could be effectively controlled for durations desired by the paging system to periods of a few hours. A significant advantage of the paging systems as embodied in the present invention is the translation of the unique identification codes on the subscriber access cards to the supplemental identification codes on the coded tickets. By translating the lengthy subscriber unique identification code, which is necessitated by the unlimited number of subscribers each requiring a unique identity, to a relatively short identification comparable to the number of sensor units in any one location, a relatively low data rate from the processor to the sensor units can be utilized. In this manner the sensor units and in particular the communication lines 5 can be comprised of conventional wire. Further, the electronic circuits utilized in he sensor can therefore be appreciably reduced to the form of a low-numbered "bit" shift register, for example, a five-bit register.

Figure 5:
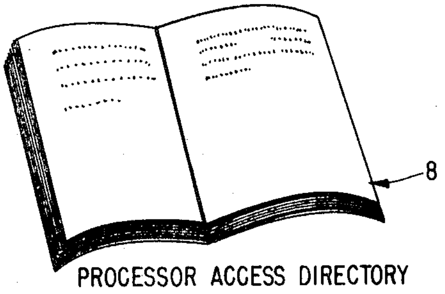
FIG. 5 is a diagram of the processor access directory which may advantageously embody the invention.

The system as described in the present invention having been accessed by the subscriber as aforedescribed, is now prepared to accept a paging request originated at any telephone instrument 1. The processor at each unique location offering the service of the paging system embodying the present invention, is identified by a conventional seven-digit telephone number which can be rung in a manner common to the art, through the switching center 2. A processor access directory 8, which lists the telephone numbers connect a pager to the system at each location is illustrated in FIG. 5. Since the system can be connected to any location serviced by a telephone network to which it is connected it can cross the boundaries between cities, states, and nations. Utilization of the automatic electronic paging system by any subscriber at any time is therefore limited only by the number of sensor and the processor memory which by embodiment of the present invention will only be required to retain in memory those unique identification codes which have been inserted at a particular location offering the service of the automatic electronic paging system of the present invention. The actual paging function of the present invention is accomplished in the following manner. The paging party, utilizing a telephone instrument 1, dials, or by use of a push button, multitone telephone is connected to the processor via the telephone network, including radio relay if so utilized, as a function of being dialed and rung in a conventional manner. A positive indication of connection to the processor is generated by the processor and is provided to the paging party in the form of a tone which can be transmitted via the telephone system. The paging party then proceeds to dial the subscriber access card unique identification number into the processor, which is in turn recorded by the processor. The processor has the capability of interpreting the incoming subscriber access card identification code and determining the presence of the subscriber being paged by the aforementioned previously recorded identical unique identification number. If a positive correlation is obtained the processor has the capability of providing an indication of this correlation to the paging party via the telephone system. The processor next proceeds to transmit via the lines 5, the supplemental identification code recorded on the coded ticket which has been associated with the aforementioned subscriber access card number. The processor maintains the telephone connection during this entire process.

The plural sensor units are all receiving the transmitted supplemental identification code. However, only the one sensor actuated and identified by the presence of the coded ticket containing the identical supplemental code will respond and cause a stimulation of the paged party. It shall be an embodiment of the present invention to permit the subscriber to acknowledge the stimulation by depressing a button, etc., which in turn is transmitted to the paging party as an acknowledgement and thereby also clearing the processor for additional traffic. It shall further be an embodiment of the present invention to provide the capability for the processor to additionally record in memory an additional multidigit number transmitted by the paging party. The embodiment of the present invention shall provide this feature by the retention and association of this information with the subscriber access card identification code and coded ticket numbers in memory. Such recorded numbers could be telephone numbers or previously established private subscriber codes having only special meaning to the paging and paged parties. The processor embodied in the present invention shall have the capability to readout the recorded multidigit number on a visual display or print out mechanism when appropriately accessed by the subscriber access card. This access position is shown as 12 of Figure 6.

A further embodiment of the processor of the present invention shall be the capability of causing an automatic hang up within a predetermined interval once rung in order to provide maximum access to the processor by awaiting paging parties.

Figure 7:
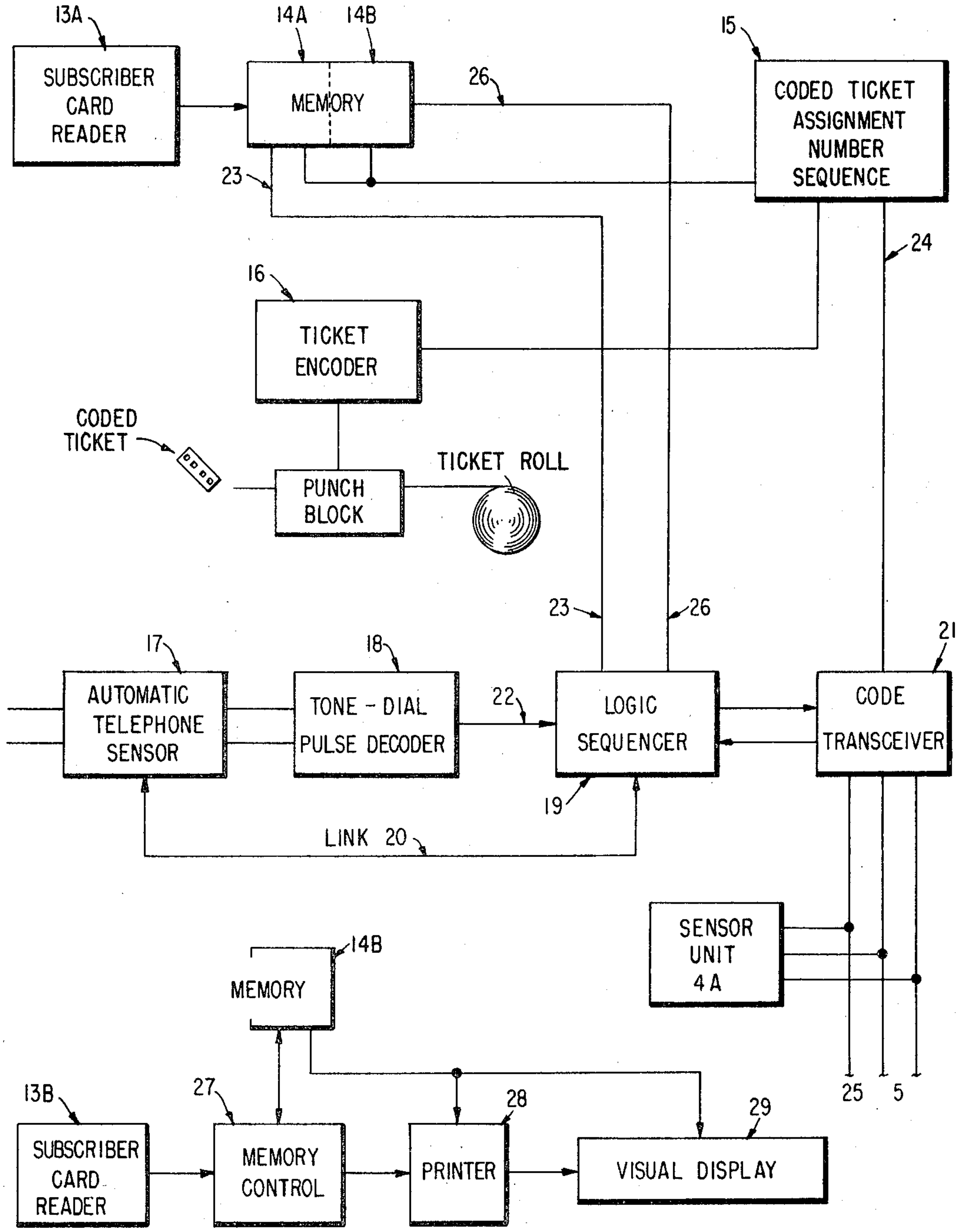
FIG. 7 is a schematic representation in block diagram form of a processor associated with the present invention.

It will be observed that in the embodiments of the invention, a key element lies in the capabilities of the processor. Figure 7 is a block diagram representative of the requirements of a processor for use in a system embodying the elements of the present invention. The embodiment of the present invention is such that the processor shall embody known techniques and equipment not heretofore applied to an automatic electronic paging system.

The subscriber access card is read by the subscriber card reader 13 and placed in the memory 14A. The memory position is essentially in parallel with that of the ticket assignment number sequence 15. This operation is essentially a record-keeping process. The ticket encoder 16 works in direct conjunction with the ticket assignment number coding sequence 15 by preparing and issuing the properly coded ticket number. An incoming paging request is initially received by the automatic telephone sensor 17 which performs "on" and "off" hook telephone functions. The tone-dial pulse decoder 18 will adjust all incoming pulses and tones to a form usable by the processor logic sequencer 19. The tone-dial decoder is conventional. An example of one such decoder is described in the Automatic Electric Technical Bulletin 200–416, published 1964. Other examples of such decoders are the North Electric Company tone receivers models PEC 7410 and PEC 7419. In brief those tone-dial pulse decoders convert the tone signals or dial generated signals representing the unique identification code into a code language, such as binary words, acceptable by the processor. The memory 14B is reserved for the recording of incoming digital signals to be associated with stored unique identification codes of the subscriber access cards recorded in memory 14A. The code transceiver 21 performs functions necessary to send and receive information over the lines 5 to and from the sensor units 4A through 4nth. The code transceiver 21 and sensor units 4A–4nth are conventional. An example of the code transceiver is the Larse corporation SEN Module Model LCS–150 while an example of the sensor unit is the Larse Corporation REDE Module model LCR–250. Acknowledgment capability is provided by including with model LCR–250 a Larse Corporation model LCT–490 tone transmitter. In brief the code transceiver converts incoming, parallel received binary coded words into a serial information signal. In the case of equipment mentioned above, the SEN module converts a parallel received binary word into an FSK moduled signal transmitted along lines 5. In such a case, line 24 represents a group of lines each carrying one bit. The group of lines 24 provides the parallel input to transceiver 21. The LCR-250 module is responsive to such modulated signals and converts the received FSK signal back to a binary coded word for comparison with the supplemental code recorded on the coded ticket which has been inserted in a card reader associated with the sensor unit.

Utilizing the above processor a typical paging requirement is processed in the present invention as follows: An incoming call causes the automatic telephone sensor 17 to come off hook. The off hook condition is sensed by the logic sequencer 19 which in turn provides a distinct signal via link 20 to the telephone sensor 17 and in turn back to the pager. The subscriber access card number is next transmitted by the pager and converted as required in the tone-pulse dial decoder 18 previously described and forwarded to the logic sequencer via line 22. The logic sequencer, 19, via command line 23 interrogates the memory 14A to determine a correlation between the paging request and previously recorded subscriber unique identification codes. If the correlation is obtained, indicating a paged party presence, a positive tone indication is sent back to the pager. The supplemental identification code is sent via line 24 to the code transceiver 21, and on to communication lines 5. The appropriate sensor unit responds to the code transmitted as aforedescribed. The acknowledgement is sent back to the logic sequencer via the 25, and is in turn transmitted to the pager. In the event the pager sends an incoming digital message, it is entered via line 26 to memory 14B. After a predetermined time the logic sequencer restores the system to a form suitable for additional incoming page requests and aforedescribed processes. The entire digital process is considered to be particularly rapid and will have significant traffic handling capability.

As illustrated in Figure 7, at such time as the subscriber accesses the processor to retrieve the pager transmitted and processor recorded information, the subscriber access card is inserted in code reader 13B, activating memory control 27, and retrieving information from memory 14B which is printed out by printer 28 or displayed by the visual display 29.

It should be noted that in the present invention the processor requires no correlation between the sensor units other than the coded ticket 6, regardless of the number of sensors installed. It should also be noted that the sensors acquire their individual identity solely through the function of the subscriber inserting a coded ticket upon which has been previously recorded a supplemental identifying code.

While the invention has been particularly shown and described with reference to preferred embodiments thereof, it will be understood by those skilled in the art that the foregoing and other changes in form and details may be made therein, without departing from the spirit and scope of the invention.

What is claimed is:

1. An automatic electronic paging system for individually paging at least one of a plurality of subscribers within a predefined area, each subscriber being identified by a unique identification code, comprising:
   a. means for assigning to each of a number of subscribers a supplemental identification code;
   b. memory means for storing the unique identification codes and the corresponding assigned supplemental identification codes;
   c. means for interrogating said memory means to determine if the unique identification code corresponding to said at least one subscriber is stored therein;
   d. memory readout means for reading out the supplemental identification code corresponding to the at least one subscriber unique identification code; and
   e. a plurality of sensor means within said area each of said sensor means including temporary storage means for storing one supplemental identification code, means for determining correspondence between a stored supplemental identification code and a read out supplemental identification code and means for producing a paging signal in response to correspondence.

2. The paging system of claim 1 wherein each of said sensor units further include acknowledgement means for signalling receipt of a paging signal.

3. The paging system of claim 1 wherein said means for assigning includes card coder means for recording each assigned supplemental code on a card in response to the assignment and storage of each supplemental identification code, said temporary storage means in each of said sensor means including first card reader means for receiving cards coded with supplemental codes.

4. The paging system of claim 3 further including input means for controlling said means for assigning supplemental identification codes.

5. The paging system of claim 4 wherein said unique identification codes are recorded on machine readable cards, said input means including second card reader means for reading and transferring a unique identification code to said memory.

6. The paging system of claim 5 wherein paging of a subscriber is initiated over telephone lines by transmitting a code over the telephone lines identifying a predefined area, said means for interrogating including means, responsive to an area identification code, for receiving a unique identification code and means for scanning said memory for a corresponding unique identification code.

7. The paging system of claim 6 further including means responsive to an indication of correspondence between the received unique identification code and a stored unique identification code for enabling receipt of a coded message and message store means for storing said received coded message.

8. The paging system of claim 7 further including third card reader means responsive to the unique identification code recorded on a machine readable card, message store control means responsive to said second card reader for accessing said message store means to readout the stored message corresponding to the unique identification code contained on said machine readable card.

* * * * *

UNITED STATES PATENT OFFICE
CERTIFICATE OF CORRECTION

Patent No. 3,641,276 Dated February 8, 1972

Inventor(s) Michael I. Keller et al

It is certified that error appears in the above-identified patent and that said Letters Patent are hereby corrected as shown below:

IN THE SPECIFICATION

| | | |
|---|---|---|
| Col. 3, | Line 7 | After usage delete "renumeration" insert--remuneration-- |
| Col. 3, | Line 25 | Before sensor delete "he" insert --the-- |
| Col. 4, | Line 37 | After reader 13 insert --A-- |
| | Line 47 | After "tone-dial" insert --pulse --; |
| Col. 4, | Line 73 | Before signal delete "moduled" insert -- modulated-- |
| Col. 5, | Line 24 | After via delete "the" insert--line-- |

Signed and sealed this 29th day of August 1972.

(SEAL)
Attest:

EDWARD M.FLETCHER, JR.
Attesting Officer

ROBERT GOTTSCHALK
Commissioner of Patents